(12) United States Patent
Kim et al.

(10) Patent No.: US 8,195,195 B2
(45) Date of Patent: Jun. 5, 2012

(54) SYSTEM AND METHOD FOR PROVIDING MOBILITY EVENT TRIGGERED SERVICE OF TARGET SET AND TARGET SET

(75) Inventors: Joo-Young Kim, Suwon-si (KR); Hae-Young Jun, Anyang-si (KR); Wuk Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1272 days.

(21) Appl. No.: 11/870,534

(22) Filed: Oct. 11, 2007

(65) Prior Publication Data
US 2008/0174491 A1 Jul. 24, 2008

(30) Foreign Application Priority Data
Oct. 11, 2006 (KR) .................. 10-2006-0099094

(51) Int. Cl.
H04W 24/00 (2009.01)
H04M 1/725 (2006.01)

(52) U.S. Cl. ............... 455/456.2; 455/456.3; 455/456.5; 455/456.1; 455/414.2

(58) Field of Classification Search ............... 455/414.1, 455/414.2, 414.3, 456.1, 456.2, 456.3, 456.5, 455/456.6
See application file for complete search history.

(56) References Cited

U.S. PATENT DOCUMENTS

| 6,088,598 | A * | 7/2000 | Marsolais | 455/566 |
| 7,623,860 | B2 * | 11/2009 | Hurst | 455/432.1 |
| 7,627,332 | B2 * | 12/2009 | Shim | 455/456.1 |
| 2005/0250516 | A1 * | 11/2005 | Shim | 455/456.1 |
| 2006/0293066 | A1 * | 12/2006 | Edge et al. | 455/456.3 |

* cited by examiner

*Primary Examiner* — Un C Ho
(74) *Attorney, Agent, or Firm* — Jefferson IP Law, LLP

(57) ABSTRACT

A system and a method for providing a mobility event triggered service of a target set and the target set are provided. When a mobility triggered service is started, a target set stores a unique identifier related to an area where the target set itself is currently located, and compares a unique identifier stored at present while identifiers are continuously stored during an agreed time interval in the mobility triggered service with the unique identifier related to the area where the target set itself is currently located. If there is the difference between two unique identifiers, the target set stores the unique identifier related to the area where the target set itself is currently located, and with determination of its movement, determines that an event of the mobility triggered service happens. Then, the target set reports the occurrence of the event to an H-SLP, and the H-SLP begins to calculate position values of the target set according to a set condition of a current mobility triggered service. Next, the H-SLP transmits the calculated position value to a SUPL agent. Thus, if a position of the target set changes, the SUPL agent can detect a change of the position of the target set or can be supplied with information on a current position according to the position change of the target set.

25 Claims, 5 Drawing Sheets

SYSTEM AND METHOD FOR PROVIDING MOBILITY EVENT TRIGGERED SERVICE OF TARGET SET AND TARGET SET

PRIORITY

This application claims the benefit under 35 U.S.C. §119 (a) of a Korean patent application filed in the Korean Industrial Property Office on Oct. 11, 2006 and assigned Serial No. 2006-0099094, the entire disclosure of which is hereby incorporated by reference.

BACKGROUND OF THE INVENTION

1. Field of the Invention

The present invention relates to a triggered service. More particularly, the present invention relates to a mobility triggered service in which a position of a target set is calculated when the target set moves.

2. Description of the Related Art

In general, a triggered service refers to a service in which calculation of a position value of a target set is periodically or aperiodically repeated with conditions previously established (i.e., a periodic triggered service), or in which if the target set reaches or gets out of a predetermined area, an event is considered to be happening (i.e., area triggered service), the position value of the target set is calculated, and then the calculated position value is provided to a Secure User Plane Location (SUPL) agent.

Among the above conventional methods for providing services in which position information is repeatedly provided with conditions previously established, the periodic triggered service will be described with reference to FIG. 1.

A. A SUPL agent 101 periodically sends a Mobile Location Protocol Triggered Location Request Report (MLP TLRR) to a Home SUPL Location Platform (H-SLP) 103. Then, H-SLP 103 verifies periodic location service authority of the SUPL agent 101 by using CLIENT IDentification (ID) corresponding to a unique identifier of the SUPL agent 101. If the location service authority of the SUPL agent 101 is valid, the SUPL agent 101 verifies if the SUPL agent 101 can use the position value of a target set 105 by using Mobile Station IDentification (MSID) corresponding to an identifier of the target set 105 which has made a request. A method used at this time is to make a decision by verifying a subscriber privacy profile of the target set 105 that a terminal user of the target set 105 has already defined. The subscriber privacy file corresponds to a list which is prepared by the terminal user of the target set 105, and which includes persons who can use the position value of the terminal user. At this point, identifiers representing the persons who can use the position value of the terminal user of the target set 105 are produced by using the respective IDs of the target sets used by the persons. The identifiers used at this moment may be, e.g., a Mobile Station International Integrated System Digital Network (ISDN) Number (MSISDN), including a telephone number and the like.

B. The H-SLP 103 verifies if the target set 105 is in a process of roaming, and also verifies if the target set 105 can use SUPL protocol employed in calculating a position. This is why it is assumed that the position of the target set 105 is calculated by using the SUPL protocol in an exemplary embodiment of the present invention. However, it is needless to say that this is nothing but an exemplary embodiment of the present invention, and an exemplary embodiment of the present invention may also be applied to a case where another position calculation protocol is employed. Thus, it goes without saying that the H-SLP 103 is allowed to verify if the target set 105 uses a relevant position calculation protocol in the case where another position calculation protocol is employed, the H-SLP 103.

C. The H-SLP 103 sends a SUPL INITiate (INIT) message required to initiate a position calculation to the target set 105, and starts a periodic location service. Then, a method for transmitting the SUPL INIT message may be implemented by using a Wireless Application Protocol (WAP) push method or a Short Message Service (SMS) trigger method. The SUPL INIT message includes a SESSION ID which represents a session currently linked between the H-SLP 103 and the target set 105, a TRIGGER-TYPE which represents kinds of periodic location services, a POSMETHOD which represents a position calculation method, and a SLP MODE which represents the form of the H-SLP 103.

D. Upon receiving the SUPL INIT message, the target set 105 is linked to the H-SLP 103 via a data network.

E. The target set 105 sends a SUPL TRIGGERED START message required to start a location service. Then, the SUPL TRIGGERED START message includes parameters, such as a SESSION ID, a Location ID (LID) which represents information of a network in which the target set 105 exists at present, a SET-CAPABILITIES which represents a position calculation method and the like.

F. The H-SLP determines a position calculation method (i.e., a positioning method) by transmitting a SUPL TRIGGERED RESPONSE message, and transmits conditions of the periodic location service to the target set 105.

G. The H-SLP 103 transmits a Mobile Location Protocol Triggered Location Request Answer (MLP TLRA) message to the SUPL agent 101, and gives notice that the requested periodic location service is started.

H. The target set 105 memorizes a period in order to perform a position calculation, and transmits a SUPL POS INIT message required to initiate a position calculation at the expiration of a relevant period. At this time, the target set 105 transmits a SESSION ID and a Location ID (LID) which represents information of a network in which the target set 105 itself exists at present.

I. The H-SLP 103 and the target set 105 perform the position calculation.

J. The H-SLP 103 transmits the calculated position value to the SUPL agent 101.

Among the above steps, H, I and J steps occur repeatedly while the periodic location service is provided.

K, L, and M steps are substantially the same as H, I and J steps, respectively.

Therefore, the target set sends, to the H-SLP, a message required to initiate a position calculation process occurring during the periodic location service in the conventional periodic triggered service. Namely, the target set memorizes a period so as to perform the position calculation by periods, and if the period begins, the target set regards it as the occurrence of an event. At this time, the target set transmits, to the H-SLP, a message requesting the position calculation process to be initiated. Then, the H-SLP receives, from the target set, the message requesting the position calculation (i.e., a positioning session) process to be initiated, and from that time, initiates the position calculation process.

Namely, only the target set determines the period at which the position calculation is performed, and the H-SLP only detects, from the target set, the message requesting the position calculation process to be initiated. Accordingly, the H-SLP waits for only the reception of the message requesting the position calculation process to be initiated, and only after the message has been received, the process for calculating a position of the target set is started.

Therefore, the prior art has such drawbacks that if the target set misses determining the period at which the position of the target set is calculated, the target set does not transmit, to the H-SLP, the message requesting the position calculation process to be initiated, and accordingly the position calculation process does not occur. After all, since the position value is not calculated at a relevant period, the service for providing the position of the target set is not implemented.

Also, even though there exists the area triggered service in which the position value of the target set is calculated if the target set arrives at a prescribed area with the prescribed area previously established, at present, the real state of things shows that there exists no services in which with a change of a position of a target set itself regarded as an event, the position value is calculated, and then a SUPL agent is informed of the calculated position value.

SUMMARY OF THE INVENTION

An aspect of the present invention is to address the mentioned problems and/or disadvantages and to provide at least the advantages described below. Accordingly, an aspect of the present invention is to provide a system and a method for providing a mobility triggered service in which a Secure User Plane Location (SUPL) agent is informed of a position change of a target set if a position of the relevant target set changes during an time interval.

In accordance with an aspect of the present invention, a system for providing a mobility event triggered service of a target set is provided. The system includes a Home Secure User Plane Location (SUPL) Location Platform (H-SLP) for sending a received mobility triggered service request to a specific target set on receiving the mobility triggered service request of the specific target set from a SUPL agent, and for providing a received report to the SUPL agent on receiving the report of a mobility triggered service according to the occurrence of an event from the specific target set, and a target set for storing information peculiar to an area where the target set is currently located if the mobility triggered service request is received from the H-SLP, for comparing a newly received subsequent information peculiar to an area with the previously stored information peculiar to the area if the subsequent information peculiar to an area is newly received, for determining that an event occurs if there is the difference between the two pieces of information, and for providing a report of the mobility triggered service giving notice of the occurrence of the event to the H-SLP.

In accordance with another aspect of the present invention, a method for providing a mobility event triggered service of a target set, and for providing a mobility triggered service to a Secure User Plane Location (SUPL) agent in a system is provided. The system includes a Home SUPL Location Platform (H-SLP) for supporting the mobility triggered service, the SUPL agent for requesting the mobility triggered service in regard to a specific target set and the specific target set. The method includes (a) transmitting a mobility triggered service request message in regard to the target set including an occurrence determination condition of the mobility triggered service from the SUPL agent to the H-SLP, (b) transmitting the mobility triggered service request message from the H-SLP to the target set, (c) sensing the start of the mobility triggered service according to the occurrence determination condition of the mobility triggered service, and storing information peculiar to an area where the target set is currently located by the target set, (d) comparing, by the target set, newly received subsequent information peculiar to an area with the previously stored information peculiar to the area if the subsequent information peculiar to an area is newly received, (e) determining, by the target set, that an event of the mobility triggered service occurs if there is a difference between the two pieces of information, (f) transmitting a report according to the mobility triggered service including a notice of an event occurrence from the target set to the H-SLP, (g) providing, by the H-SLP, the report according to mobility triggered service to the SUPL agent, and (h) repeating, by the target set and the H-SLP, steps (d) to (g) according to the occurrence determination condition of the mobility triggered service until the mobility triggered service is completed.

In accordance with a further aspect of the present invention, a target set in a system for providing a mobility triggered service and having a Secure User Plane Location (SUPL) agent, the target set and a Home SUPL Location Platform (H-SLP) is provided. The target set includes a receiving unit for receiving information peculiar to an area where the current target set is located at this point in time from an external entity of the target set if the mobility triggered service is started, a memory unit having a first memory unit for storing information on an occurrence condition and a report condition of the mobility triggered service, a second memory unit for the received information peculiar to the area and a third memory unit for storing information peculiar to an area which has been received from the receiving unit before this point in time, a comparison processing unit for comparing the information peculiar to the area where the current target set is located at this point in time with the information peculiar to an area which has been received before this point in time, and for determining if there is the difference between the two pieces of information, a report processing unit for generating a report giving notice that an event of the mobility triggered service occurs according to a condition of the report if it is determined that there is the difference between the two pieces of information, and a transmission unit for transmitting the generated report to the H-SLP if the report is generated.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations are omitted for clarity and conciseness.

When a mobility triggered service is started, a target set stores a unique identifier related to an area where the target set itself is currently located, and compares a unique identifier stored at present while identifiers are continuously stored during an agreed time interval in the mobility triggered service with the unique identifier related to the area where the target set itself is currently located. If there is a difference between two unique identifiers, the target set stores the unique identifier related to the area where the target set itself is currently located, and with determination of its movement, determines that an event of the mobility triggered service happens. Then, the target set reports the occurrence of the event to an H-SLP, and the H-SLP begins to calculate position values of the target set according to a set condition of a current mobility triggered service. Next, the H-SLP transmits the calculated position value to a SUPL agent. Thus, if a position of the target set changes, the SUPL agent can detect a change of the position of the target set or can be supplied with information on a current position according to the position change of the target set.

Figure 1:
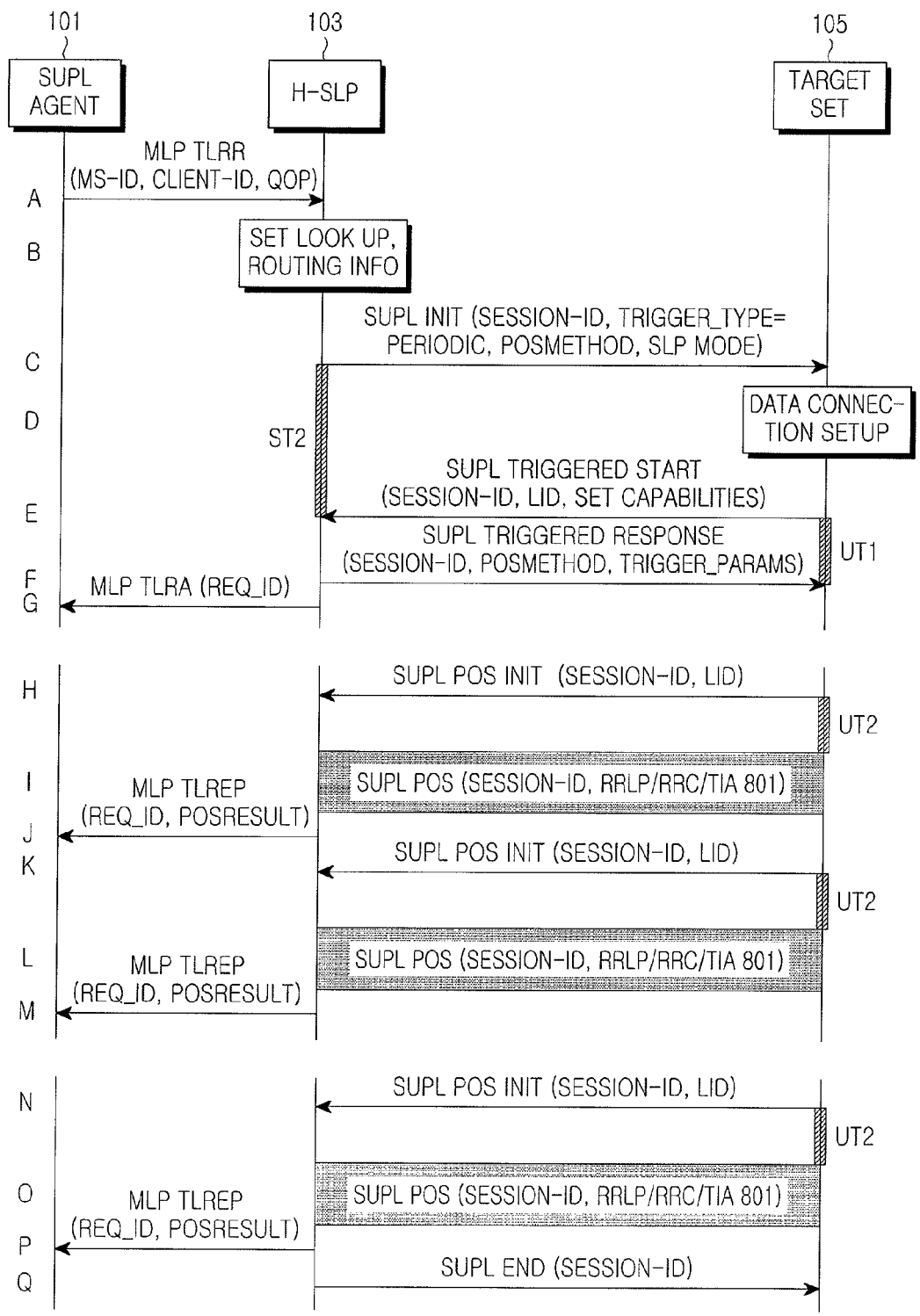
FIG. 1 is a view illustrating an operation flow with which a conventional periodic triggered service is implemented.
Figure 2:
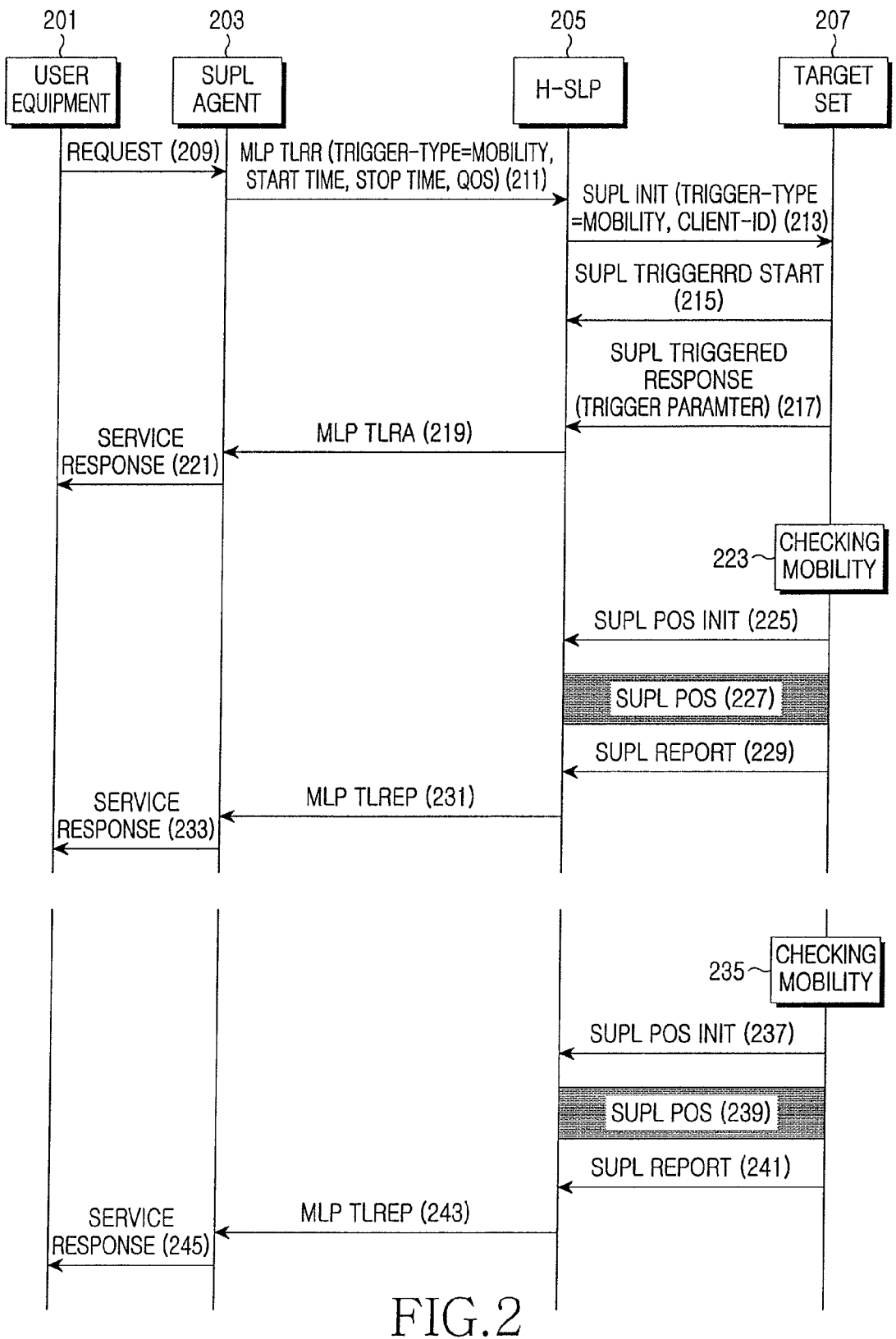
FIG. 2 is a view illustrating an operation flow with which a mobility triggered service is implemented according to an exemplary embodiment of the present invention.

FIG. 2 is a view illustrating an operation flow with which a mobility triggered service is implemented according to an exemplary embodiment of the present invention. As illustrated in FIG. 2, a SUPL agent 203 specifies a target set 207 whose position is to be calculated, and delivers, to an H-SLP 205, a condition requesting the H-SLP 205 to transmit a report to the target set 207 whenever the target set 207 changes in its position. The SUPL agent 203 can specify start time and stop time of a relevant location service.

Also, if the H-SLP 205 receives a location service request from the SUPL agent 203, the H-SLP 205 exchanges messages with the target set 207 and then performs a process to calculate a position value of the target set 207. In the above message exchange, the H-SLP 205 can transmit a trigger service type and trigger service conditions received from the SUPL agent 203 to the target set 207 as they are, or after converting the trigger service type and the trigger service conditions presented by the SUPL agent 203 into parameters detected by the target set 207, the H-SLP 205 can transmit the parameters to the target set 207.

The target set 207 signifies a terminal corresponding to an object whose position calculation has been requested by the SUPL agent 203. The target set 207 determines, with conditions of mobile triggered services received from the H-SLP 205, if an event happens. The conditions of the mobile triggered services can be the duration of the location service, start time, stop time and the like. Also, conditions of the occurrence of the event are as follows. In a case when the target set 207 obtains access to a packet switching network, if a router having charge of or an entity managing a network in which the target set 207 exists receives a location ID, including a cell ID, an access ID or an Internet Protocol (IP) address to be delivered to the target set 207, it is determined that an event happens, and reports the occurrence of the event to the H-SLP 205. Herein, the location ID means an ID or an identifier representing a cell where a Base Station (BS) can transmit/receive a signal in a Code Division Multiple Access (CDMA) network, a Universal Mobile Telecommunications Systems (UMTS) network, a General Packet Radio Service (GPRS) network, a Global System for Mobile communications (GSM) network and the like. Hereinafter, the cell ID or the location ID is used in an exemplary embodiment of the present invention including the above meaning. To give another case, when the target set 207 obtains access to a packet switching network, a router having charge of an entity (e.g., a BS or an access point) managing a network in which the target set 207 exists compares a newly received access ID or IP address with a location ID including a cell ID, an access ID or an IP address, which has already been stored in the target set 207, and if there exists the difference between the two parameters, determines that an event happens. Then, the router or the entity reports the occurrence of the event to an H-SLP 205. Also, in a case when the target set 207 gains access to a cellular network, a cell ID transmitted from the BS can be used. Namely, the target set can use the access ID, the IP address, the cell ID and the like as a unique identifier of an area where the target set itself is currently located. Besides, if an identifier exists representing an area of which a BS or a router can be in control, the target set can determine by using the identifier if there exists a change in a position of the target set.

In addition, if the target set 207 exists in a World interoperability for Microwave Access (WiMAX) network, an access ID transmitted from an access point can be used as an identifier necessary to determine if a change exists in a position of the target set 207. Herein, examples of the WiMAX network includes a Wireless Local Area Network (WLAN), a Wireless BROadband (WiBRO) and other networks through which wireless internet services are available.

It goes without saying that if mobile IP is used, the target set 207 can use the mobile IP as an identifier required to distinguish mobility of the target set 207. When the target set 207 receives a finished IP address (e.g., a Care Of Address or a COA) from an entity (e.g., a router) managing a relevant area or even when the target set 207 receives a prefix IP address necessary to make an IP address that the target set 207 is about to use, if the target set 207 moves, the prefix IP address changes. On this account, a method at this time compares a variety of prefix IP addresses with the prefix IP addresses, and if there is the difference between the two prefix IP addresses, the target set 207 can also detect that its position changes. This is why the meaning that currently received value is different from previously received value indicates that the target set 207 has moved.

Referring to FIG. 2, in step 209, a user that is about to use a location service transmits a request message to a SUPL agent 203 by using a user equipment 201. At this time, the user equipment 201 specifies a target set 207 whose position value is to be calculated, and sets a kind of location service to be received. Hereinafter, a description will be made of an exemplary embodiment wherein the user of the location service (i.e., the user equipment 201) seeks to receive a report giving notice of a change in a position of the target set 207 in a case where the target set 207 moves to change its position during a definite period of time in an exemplary embodiment of the present invention.

In this case, the user equipment 201 presents a kind of service that the user equipment 201 seeks to receive and conditions related to the service. The presented conditions represents whether the position value is to be received or whether only a simple alarm is to be received during a service period or when receiving the alarm. In addition, when requesting the location service, various conditions representing requirements of the user can be added. For example, when the user equipment 201 is informed of the position value, the user equipment 201 can present the accuracy of the position value (i.e., Quality of Position, or QoP). Herein, it is needless to say that various changes in form can be made to the conditions presented by the user according to kinds and methods of location services.

In step 211, the SUPL agent 203 receiving a request from the user equipment 201 selects protocol for going forward with the relevant service. This protocol corresponds to protocol used when the SUPL agent 203 exchanges messages for the location service with the H-SLP 205, and becomes different depending on what kind of network causes the SUPL agent 203 and the H-SLP 205 to gain access to each other.

In an exemplary embodiment of the present invention illustrated in FIG. 2, a description will be made on the assumption of the use of Mobile Location Protocol (MLP) that can be used when communications between the SUPL agent 203 and the H-SLP 205 are implemented over an IP network as an example of protocol like this. The MLP corresponds to protocol used by Open Mobile Alliance LOCation Working Group (OMA LOC WG) standards group. However, this is only an exemplary embodiment of the present invention, and it goes without saying that even if another protocol is employed, the idea of the art of an exemplary embodiment of the present invention can be similarly applied to a case of the use of another protocol. In the same manner, the SUPL agent 203 corresponds to an entity receiving a request from the user equipment 201, and transmitting a request message to the H-SLP 205. The SUPL agent 203 transmits, to the H-SLP 205, a Mobile Location Protocol Triggered Location Reporting Request (MLP TLRR) message needed to request the location service. Herein, the MLP TLRR message includes a session ID, an ID of the target set, a trigger type, trigger parameters and the like.

In the above, the session ID corresponds to an identifier used to distinguish a session of a currently requested service from other sessions, the ID of the target set represents an identifier of the target set 207 and the trigger type represents what kind of location service is requested. At present, kinds of triggered services include a periodic triggered service and an area event triggered service, and the additional mobility triggered service is included in a triggered service according to an exemplary embodiment of the present invention. In the following description, the mobility triggered service is used as the kind of triggered service.

The SUPL agent 203 sets the trigger type to mobility, and delivers the set trigger type to the H-SLP 205. Also, the trigger parameters include conditions of a currently requested service, e.g., start time representing a period of time during which the service progresses, stop time or information on a definite period of time. Herein, the stop time can be an infinite quantity. When receiving a report according to the movement of the target set 207, the SUPL agent 203 can receive only a report giving notice that a position of the target set 207 changes, or can receive the report giving notice of the change in position of the target set 207 simultaneously with the position value of the target set 207. Set contents like this are included in the trigger parameters.

TABLE 1

| start time | stop time | report type | QoP |
| --- | --- | --- | --- |

TABLE 1 shows examples of the trigger parameters included in the MLP TLRR message. The SUPL agent 203 presents conditions of a relevant location service request by using these parameter values. In TABLE 1, the start time and the stop time represent a period of time of the service. The report type represents either sending the report with the position value of the target set 207 when sending the report (i.e., report with position) or sending the report without the position value when sending the report (i.e., report only). Herein, if the report type is set to 'report only,' only the report is received without the position value, and if the report type is set to 'report with position,' the position value is transmitted along with the report. The 'report type' parameter can be represented to have one bit or one byte in length. For example, '0' represents 'report only,' and '1' can denote 'report with position.'

In step 213, if receiving a request message, the H-SLP 205 sends a location service request message to the target set 207. A description will be made of an exemplary embodiment of the present invention on the assumption that protocol used by the H-SLP 205 and the target set 207 corresponds to SUPL (OMA LOC WG is in process of standardization thereof) protocol. The SUPL protocol corresponds to protocol used to calculate the position value of a terminal or position values of entities, employing IP protocol. In addition, a description will be made of an exemplary embodiment of the present invention, putting case that the target set 207 exists in a home network. Still, it goes without saying that an exemplary embodiment of the present invention can be applied even to a roaming case where the target set 207 exists in an external network. This is why when determining if a position changes, even the target set 207 to which roaming is applied detects a change of a cell ID or an access ID or an IP address transmitted from an entity (e.g., a BS or a router or an access point, etc.) existing within an external network to which the target set 207 gains current access, and can provide the mobility triggered service.

The H-SLP 205 sends a SUPL INIT message to the target set 207. This message includes a trigger type representing kinds of the triggered services. Then, the trigger type is set to mobility in order to progress a triggered service by specifying the mobility of the target set 207 for an event.

In step 213, the H-SLP 205 transmits, to the target set 207, a SUPL agent ID corresponding to an ID of the SUPL agent 203 requesting the triggered service. The SUPL agent ID can also include an ID of an original triggered service requester. The original triggered service requester signifies a user of a user equipment 201 requesting the mobility triggered service. Then, as the SUPL agent ID, an ID of the user equipment 201 or a telephone number given to the user equipment 201, or other unique IDs given to respective serves can be used.

On receiving the SUPL INIT message, the target set 207 determines the trigger type and the SUPL agent ID, and determines if the target set 207 approves a relevant service according to the trigger type. It is a matter of course that the determination is implemented according to a user privacy profile which the target set 207 has or a user of the target set 207 can be allowed to select in person whether the relevant service is approved.

In a case where the location service requested by the user of the target set 207 or by the user privacy profile is approved, the target set 207 delivers a SUPL TRIGGERED START message to the H-SLP 205 in step 215. The SUPL TRIGGERED START message includes information (i.e. a Location ID, or LI, e.g., a cell ID, etc.) on a network in which the target set 207 currently exists. Besides, other information can be similar to a part disclosed in a 5.1.8 chapter of OMA TS-ULP-V2.0 spec. which is being managed in OMA LOC.

In step 217, if receiving the SUPL TRIGGERED START message denoting location service approval from the target set 207, the H-SLP 205 delivers a SUPL TRIGGERED RESPONSE message to the target set 207. The H-SLP 205 sets mobility for an event occurrence condition, and transmits information on conditions employed while the mobility triggered service progresses. This information is included in the trigger parameters. The trigger parameters are substantially the same as the values transmitted by the SUPL agent 203 in step 211. Then, the target set 207 stores the trigger parameters in a repository (e.g., a memory unit) until a currently requested triggered service is completed.

In step 219, the H-SLP 205 sends, to the SUPL agent 203, a Mobile Location Protocol Triggered Location Reporting Answer (MLP TLRA) message giving notice of the start of the mobility triggered service as a requested service is approved by the target set 207.

In step 221, the SUPL agent 203 sends a SERVICE RESPONSE message giving notice of the start of the service to the user equipment 201 corresponding to the original service requester.

In step 223, the target set 207 determines if an event happens with the trigger parameters stored in step 217. Herein, since a current trigger type of the trigger parameters is set to mobility, the target set 207 determines if an event happens according to whether the position movement occurs.

Parameters used to this end are as follows.

1. In a case where a terminal obtains access to a cellular network, the target set 207 a location ID delivered from a BS. The location ID has its various values respectively corresponding to the GPRS, UMTS, and CDMA networks. It is usual that a cell ID is included in a location ID like this. However, in a case where a cell is divided into multiple sectors, a sector ID can be included in the location ID. The target set 207 has mobility, and therefore it is possible that the position movement occurs in the target set 207. Accordingly, as the target set 207 moves, a location ID or a cell ID transmitted from the BS becomes different. The target set 207 which has been informed that a kind of triggered service corresponds to mobility in step 213 stores the received cell ID from the BS in the repository. Then, the target set 207 compares a currently stored location ID with a location ID transmitted from the BS at present.

Next, if there is a difference between the two location IDs, the target set 207 determines that an event happens. Herein, specific values of a Location ID (LID) used when the target set 207 determines if the event happens are as in the following TABLE 2.

TABLE 2

Location Info

| Parameters | Presence | Value/Description |
|---|---|---|
| Location I | — | Describes the globally unique cell IDentification of the most current serving cell |
| Cell Inf | M | The following cell IDs are supported: GSM Cell Info Wideband CDMA (WCDMA) Cell Info CDMA Cell Info |
| Status | M | Describes whether or not the cell info is: Not current, last known cell info Current, the present cell info Unknown (i.e. not known whether the cell id is current or not current) NOTE: The Status parameter does NOT apply to WCDMA optional parameters (Frequency Info, Primary Scrambling Code and Measured Results List). Frequency Info, Primary Scrambling Code and Measured Results List, if present, are always considered to be correct for the current cell |

In the above TABLE 2, the presence of each parameter is expressed as 'M' of Mandatory meaning mandatory configuration elements or as 'O' of Optional representing optional configuration elements. Also, values of the LID include Cell Info and Status. Herein, the Cell Info has its different value according to a type of network in which the target set 207 exists. For instance, if the target set 207 is in a GSM network, the Cell Info can include the value of the GSM Cell Info. If the target set 207 is in a WCDMA network, the Cell Info can include the value of the WCDMA Cell Info. If the target set 207 is in a CDMA network, the Cell Info can include the value of the CDMA Cell Info. The following TABLE 3, TABLE 4 and TABLE 5 show the respective examples of the GSM Cell Info, the WCDMA Cell Info and the CDMA Cell Info.

TABLE 3

GSM Cell Info

| Parameters | Presence | Value/Description |
|---|---|---|
| GSM Cell Info | — | GSM Cell ID |
| MCC | M | Mobile Country Code, range: (0 . . . 999) |
| MNC | M | Mobile Network Code, range: (0 . . . 999) |
| LAC | M | Location Area Code, range: (0 . . . 65535) |
| CI | M | Cell Identity, range: (0 . . . 65535) |
| NMR | O | Network Measurement Report can be present for 1 to 15 cells. |

TABLE 4

WCDMA Cell Info

| Parameters | Presence | Value/Description |
|---|---|---|
| WCDMA Cell Info | — | WCDMA Cell ID |
| MCC | M | Mobile Country Code, range: (0 . . . 999) |
| MNC | M | Mobile Network Code, range: (0 . . . 999) |
| UC-ID | M | Cell Identity, range: (0 . . . 268435455). UC-ID is composed of RNC-ID and C-ID |
| Frequency-Info | O | Frequency info can be: fdd: uarfcn-UL, ra(0 . . . 16383) uarfcn-DL, ra(0 . . . 16383) In case of fdd, uarfcn-UL is optional while uarfcn-DL is mandatory. If uarfcn-UL is not present, the default duplex distance defined for the operating frequency band shall be used [3GPP RRC] tdd uarfcn-Nt, range: (0 . . . 16383) NOTE: Frequency Info and Primary Scrambling Code are always those of the current cell. |
| Primary Scrambling Code | O | Primary Scrambling Code, range: (0 . . . 511) NOTE: Frequency Info and Primary Scrambling Code are always those of the current cell. |
| Measured Results List | O | Network Measurement Report for WCDMA comprising both intra- and/or inter-frequency cell measurements (as per 3GPP TS 25.331). |

TABLE 5

CDMA Info

| Parameters | Presence | Value/Description |
|---|---|---|
| CDMA Cell Info | — | CDMA Cell ID |
| NID | M | Network ID, range: (0 . . . 65535) |
| SID | M | System ID, range: (0 . . . 32767) |
| BASE ID | M | Base Station ID, range: (0 . . . 65535) |

TABLE 5-continued

CDMA Info

| Parameters | Presence | Value/Description |
|---|---|---|
| BASE LAT | M | Base Station Latitude, range: (0 . . . 4194303) |
| BASE LONG | M | Base Station Longitude, range: (0 . . . 8388607) |
| REFPN | M | Base Station PN Number, range: (0 . . . 511) |
| WEEK NUMBER | M | GPS Week number, range: (0 . . . 65535) |
| SECONDS | M | GPS Seconds, range: (0 . . . 4194303) |

Also, Status represents that Cell Info that the current target set 207 receives from the BS corresponds to the past value or the current value. In an exemplary embodiment of the present invention, the target set 207 determines if a mobility event exists on the basis of the value of the LID, particularly, the value of the Cell Info, received from the network. The entity existing in the network (e.g., the BS) periodically transmits Cell Info to the target set 207. Then, the target set 207 stores the received Cell Info in the repository. Next, on receiving the Cell Info from the entity existing in the network (e.g., the BS), the target set 207 compares Cell Info newly received at present with the value of Cell Info stored in the repository, and determines if there exists the difference between the two Cell Info.

Then, if there is a difference between the two Cell Infos, the target set 207 determines according to its movement that new Cell Info is received, and also determines that a mobility event happens. Next, the target set 207 informs the H-SLP 205 of relevant data. Thereafter, the target set 207 deletes, from the repository, information that has already been stored, and stores newly received information in the repository.

However, if there is no difference, the target set 207 determines that no position change happens, and accordingly determines that no mobility event occurs. Then, the target set 207 does not transmit a report to the H-SLP 205.

2. In a case where the target set 207 obtains access to a WiMAX network or a WLAN network, a BS or an access point existing in the WiMAX network or the WLAN network transmits a message to the target set 207 in a periodic broadcasting method. This message includes an ID of the BS or an ID of the access point. Furthermore, this message may include Effective Isotropic Radiated Power (EIRP) of the BS, Frequency Assignment (FA), Received Signal Strength Indication (RSSI), and the like.

Thus, in a case where the target set 207 is located within a cell over which the BS or the access point has control, the target set 207 receives a message that the BS or the access point in control of the pertinent cell sends on the air. Then, the target set 207 stores information included in the received messages in the repository.

After that, the target set 207 periodically compares previously stored information with information included in messages transmitted from the BS and the access point. Herein, information corresponding to objects used for comparison can be ID information of the BS or the access point. At this point, if it is determined that the target set 207 moves in the case of the existence of the difference between the two pieces of information, the target set 207 transmits a report giving notice of the occurrence of the mobility event to the H-SPL 205. Then, the target set 207 deletes, from the repository, information that has already been stored, and stores, in the repository, information of a message that is newly received at present.

However, if there is no difference, the target set 207 determines that no mobility event takes place, and accordingly does not transmit a report to the H-SLP 205.

3. If the target set 207 existing in a GPRS packet switching network or a UMTS packet switching network performs IP communications, or if the target set 207 attempts to perform IP communications using IP protocol according to wireless IP, the target set 207 is given an IP address (e.g., a COA) from an access router or a BS existing within an area to which the target set 207 gains current access, or is given a prefix IP address needed to make a new IP address. At this time, the target set 207 acquires an IP address which is about to use in a currently accessed network by using the given IP address or prefix IP address, informs the BS of which network the target set 207 is located in, and requests the BS to transmit, to a currently acquired IP address, data to be transferred to the target set 207.

In the above process, the access router or the BS unconditionally transmits, in a broadcast method, a prefix IP address to the target set 207 existing in the area over which the access router or the BS has control. To take another case, if the target set 207 entering the area of which the access router or the BS is in control sends a message requesting for a prefix IP address or another message requesting for an IP address to be used, the access router or the BS transmits, in reply to this message, the prefix IP address or a complete IP address that the target set 207 is about to use.

The target set 207 stores, in the repository, an IP address produced by using the IP address or the prefix IP address received from the access router or the BS. Then, if the target set 207 receives the prefix IP address or the IP address transmitted from the access router or the BS after a definite time interval passes, the target set 207 compares, with the value which has been already stored in the repository, a currently received IP address or an IP address generated through a currently received prefix IP address.

If there is a difference between the previously stored information and the newly received information, the target set 207 determines that it has moved. Then, the target set 207 transmits a report giving notice of the occurrence of the mobility event to an H-SLP 205. Next, the target set 207 deletes previously stored information from the repository, and stores information that is newly received at present.

Still, if there is no difference between previously stored information and newly received information, the target set 207 determines that no mobility event happens, and transmits no report to the H-SLP 205.

Meanwhile, even though three cases are cited as examples here, it is a matter of course that an operation as in an exemplary embodiment of the present invention can also be performed by using other values if the target set 207 receives parameters transmitted by an entity existing over a network, if an identifier peculiar to an area included in the parameters changes as the target set moves, and if the target set 207 can detect a change of the unique identifier (i.e., an ID).

The H-SLP 205 receiving the report giving notice of the occurrence of the mobility event from the target set 207 proceeds to step 225, and confirms the report type among the contents of trigger parameters received in step 217. If the report type is set to 'report only,' the target set 207 does not proceed to a process for finding position value. In this case, the target set 207 determines in step 223 only if the mobility event happens, and if the mobility event occurs, informs the H-SLP 205 of the occurrence of the mobility event. Accordingly, in this case, the target set 207 immediately proceeds to step 229 following step 223, and transfers, to the H-SLP 205, a SUPL REPORT message giving the only notice of whether the mobility event occurs. At this time, the SUPL REPORT message does not include the position value of the target set 207.

Figure 3:
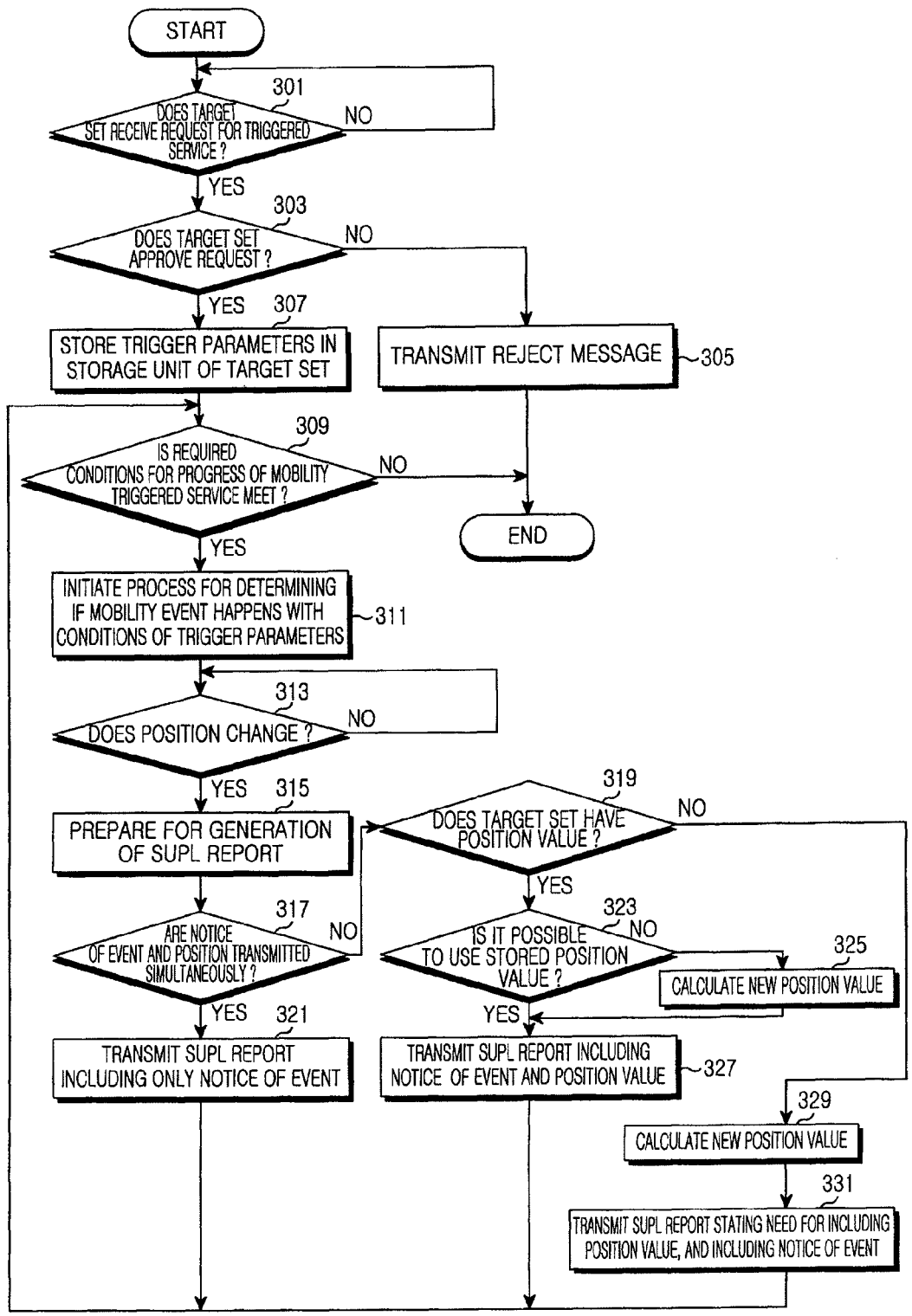
FIG. 3 is a flowchart illustrating an operation of a target set while a mobility triggered service is being implemented according to an exemplary embodiment of the present invention.

However, if the report type of the trigger parameters is set to 'report with position,' the target set 207 proceeds to step 225 in which the target set 207 transmits a SUPL POSitioning (POS) INIT message to the H-SLP 205, and then, the target set 207 and the H-SLP 205 proceed to step 227 in which the position value of the target set 207 is calculated. Herein, if the target set 207 has a previously stored position value thereof at present, the target set 207 carries out the position value thereof according to whether the previously stored position value thereof is valid. With reference to FIG. 3, a description will be made of the detailed process in which the target set 207 determines if the mobility event happens, and then calculates the position value thereof.

If the H-SLP 205 receives the SUPL POS INIT message in step 225, the H-SLP 205 exchanges messages required for the process of calculating the position value of the target set 207 with the target set 207. A method for calculating the position value and protocol, used at this time employs posmethod (i.e., the position calculation method) information included in the SUPL TRIGGERED START message and the SUPL TRIGGERED RESPONSE message exchanged in steps 215 and 217. Herein, in the position calculation method, there are two modes, including a SET-based mode in which the target set 207 calculates position value, and a SET-assisted mode in which the H-SLP 205 calculates position value. The protocol becomes different according to a type of network in which the target set 207 exists. For instance, in the case of the GSM network, Radio Resource Location services Protocol (RRLP) can be used. In the case of the WCDMA network, Radio Resource Control (RRC) protocol can be used. In the case of the CDMA network, TIS-801 protocol can be used.

In step 229, the target set 207 transfers the SUPL REPORT message in order to give notice that the mobility event occurs. Then, if the trigger type is set to 'report only' among the trigger parameters received in step 217, the occurrence of the mobility event is reported. Still, if the trigger type is differently set to 'report with position' among the trigger parameters received in step 217, the position value calculated in step 229 is transmitted. At this point, because the target set 207 calculates the position value if the position calculation method is in the SET-based mode, the SUPL REPORT message is transmitted, including the position value and the mobility event therein.

However, if the position calculation method is in the SET-assisted mode, the H-SLP 205 calculates the position value of the target set 207, and delivers the calculated position value to the target set 207 in step 227. Next, the target set 207 receiving the position value from the H-SLP 205 delivers the SUPL REPORT message, including the notice of the mobility event and the position value.

In a case where the position calculation method is in the SET-assisted mode, if the H-SLP 205 does not deliver the calculated position value to the target set 207 following the calculation of the position value, the target set 207 includes the notice of mobility event in the SUPL REPORT message, and also includes contents giving notice of the need of the position value in the SUPL REPORT message. The following TABLE 6 shows a configuration example of a SUPL REPORT message.

TABLE 6

| session-ID | trigger type | position mode | position value |
| --- | --- | --- | --- |

As shown in TABLE 6, parameters of the SUPL REPORT message include a session-ID, a trigger type, a position mode, position value and the like. Herein, the session-ID includes an identifier distinguishing between messages exchanged between the target set 207 and the H-SLP 205. The trigger type corresponds to one-byte value, and gives notice of which event happens. Until now, the types of triggered services include the periodic triggered service and the area triggered service, and the mobility event triggered service is proposed in an exemplary embodiment of the present invention. Therefore, if the value of the trigger type is set to 0001, a kind of event corresponds to the periodic triggered service. If the value of the trigger type is set to 0010, a type of event corresponds to the area triggered service. If the value of the trigger type is set to 0011, a type of event corresponds to the mobility event triggered service. Also, it goes without saying that various types of triggered services can be represented with values of the trigger types as the values of the trigger types are newly specified if various triggered services appear hereinafter.

Furthermore, the position mode parameter indicates whether the position value the target set 207 includes the SUPL REPORT message. The value of the position mode can be represented with 1-byte value or value having more than 1-byte. For example, '0000' represents a case where the position value is not included, and '0011' can express another case where the position value is included in the SUPL REPORT message. Also, if the 'position value' parameter has the value of position of the target set 207, the value of position thereof is included in the SUPL REPORT message. On the contrary, if the 'position value' parameter has no value of position thereof, null value is included in the SUPL REPORT message.

In step 231, the H-SLP 205 reports the occurrence of a pertinent event to the SUPL agent 203. Herein, a MLP TLREP message required for the H-SLP 205 to report the occurrence of the event includes the position value of a relevant target set.

Then, the H-SLP 205 determines the trigger type and the value of the trigger parameters received in step 211, and determines if the position value of the target set 207 is included. If the position value thereof must be included, the H-SLP 205 determines if the position value is included in the SUPL REPORT message transmitted by the target set 207. If the position value is included in the SUPL REPORT message, the H-SLP 205 includes the position value transmitted from the target set 207 in the MLP TLREP message, and transfers the MLP TLREP message including the position value to the SUPL agent 201.

However, in a case where the position value of the target set 207 is not included in the SUPL REPORT message even though the 'position' must be included in the 'trigger parameters,' the H-SLP 205 determines if the target set 207 has calculated position value thereof at present, includes the currently stored position value in the MLP TLREP message if the position value thereof is stored in the target set 207, and transmits the MLP TLREP message including the currently stored position value. Because the H-SLP 205 calculates the position value of the target set 207 in the SET-assisted mode, the H-SLP 205 may have lastly calculated position value.

In step 233, the SUPL agent 203 transmits a relevant mobility triggered service to the user equipment 201. Namely, if the user only wants a notice of position change of the target set 207, the user can be informed of the position change of the target set 207. If the user wants a notice of position change of the target set 207 simultaneously with the position value of the target set 207, the user can also be provided with the current position value of the target set 207 simultaneously with the position change of the target set 207.

A procedure from step 235 to step 245 is substantially the same as the procedure from step 223 to step 233.

The above same procedure becomes a single unit, and is repeatedly performed according to conditions of the trigger parameters. If an end condition is met, the mobility triggered service is completed.

FIG. 3 is a flowchart illustrating an operation of a target set while a mobility triggered service is being implemented according to an exemplary embodiment of the present invention.

With reference to FIG. 3, the target set 207 according to an exemplary embodiment of the present invention proceeds to step 301, and determines if the target set 207 receives a request for a triggered service. If the target set 207 receives the request for the triggered service, the target set 207 determines if the target set 207 approves or denies the request for the triggered service in step 303. A point of reference can correspond to either a determination made by the user of the target set 207 or a privacy profile that has already been stored by the user. If a requested service is denied, the target set 207 proceeds to step 305, and sends a reject message.

In contrast, if the requested service is approved, the target set 207 proceeds to step 307, and stores a trigger type and trigger parameters in the repository of the target set 207. Herein, stored values are used while the requested triggered service progresses. Then, the target set 207 goes forward with the requested triggered service according to conditions of the trigger type and the trigger parameters. The target set 207 proceeds to step 309, and determines according to the conditions of the trigger parameters if the required conditions for the progress of a mobility triggered service are fulfilled. Namely, for instance, the target set 207 determines if the current time is included in start time or stop time set in the trigger parameters or if the preset appointed time becomes due. If the required conditions for the progress of the mobility triggered service are satisfied, the target set 207 proceeds to step 311, and receives, from a network entity, either a cell ID (in a case where the target set exists in the cellular network), an access ID (in a case where the target set exists in the WiMAX network, including the WLAN), or an IP address. In a case where wireless IP is used, the target set receives a COA from the network to which the target set obtains access. At this time, the COA has the form of an IPv4 or IPv6 IP address. When making a COA, the target set 207 receives a prefix address with which the COA can be made from the network entity to which the target set gains access. Accordingly, in a case where the target set 207 uses the wireless IP, the prefix address transmitted from the network entity corresponds to value employed when the target set 207 determines if the mobility event happens. Also, lastly, the target set 207 can make a COA by using the prefix address. Furthermore, the target set 207 can acquire the COA by using a Dynamic Host Configuration Protocol (DHCP) method. Therefore, in a case where the wireless IP is used in an exemplary embodiment of the present invention, the value of the prefix address received or that of the COA from the network entity can be used to determine if the mobility event occurs.

The target set 207 stores, in a memory unit, either the cell ID, the access ID or the IP address received from the network. This is why it is assumed as in the above-mentioned assumption in FIG. 2 that the cell ID, the access ID, and the IP address correspond to values which can be received when the target set 207 obtains access to the network in an exemplary embodiment of the present invention.

If a definite period of time passes, the network entity delivers values, such as a cell ID, an access ID, an IP address, etc., again in step 311. In this case, the target set 207 proceeds to step 313, compares the value transmitted from the current network entity with the value stored in the storage unit, and then determines if there exists a difference between the two values. If there is no difference between the two values, the target set 207 maintains the value that has already been stored in the storage unit, and waits until values, such as a cell ID, an access ID, an IP address and the like, are received again from the network entity.

In contrast, if it is determined in step 313 that there is a difference between the two values, it is determined that the mobility event occurs. Then, the target set 207 stores currently received value in the storage unit, and deletes the previously stored value from the storage unit. Next, the target set 207 proceeds to step 315, and prepares to transmit a SUPL REPORT message in step 321.

Thereafter, the target set 207 proceeds to step 317, determines the trigger parameters stored in step 307, and then confirms if the position value of the target set 207 must be calculated when transmitting a SUPL REPORT message. This can be detected by determining a report parameter part of the trigger parameters. Next, in a case where only a notice of whether an event happens is given without the position value of the target set 207, the target set 207 includes, in the SUPL REPORT message, only the contents giving notice that the trigger type is set to a mobility event, and transfers the SUPL REPORT message to the H-SLP 205.

However, if it is determined in step 317 that there exists a request for the position value of the target set 207 in the report part of the trigger parameters, the target set 207, along with the H-SLP 205, performs a position value calculation through steps 225 and 227 illustrated in FIG. 2. If the position value calculation is finished, it is determined whether the target set 207 has the position value in step 319. This determination can be implemented before the target set 207 performs steps 225 and 227. In this case, the target set 207 proceeds to step 323, and according to whether the previous position value stored in the target set 207 or auxiliary information on the previous position is suitable for QoP requested by the SUPL agent 203, proceeds to step 327 in which without performing steps 225 and 227, by reusing the previous position value or the auxiliary information on the previous position, the target set 207 includes the previous position value or the auxiliary information on the previous position in a position part of the SUPL REPORT message, and transmits the SUPL REPORT message including the previous position value or the auxiliary information on the previous position.

In contrast, if there is no previous position value or no auxiliary information on the previous position in the target set 207, or if the previous position value or the auxiliary information on the previous position is unsuitable for QoP requested by the SUPL agent 203, the target set 207 proceeds to step 325 without using these values, performs steps 225 and 227 illustrated in FIG. 2, and then obtains the position value of the target set 207. Then, the target set 207 proceeds to step 327, includes a notice of mobility event and calculated position value in a SUPL REPORT message and then transmits, to the H-SLP 205, the SUPL REPORT message including the notice of mobility event and the calculated position value.

Meanwhile, in a case where it is determined in step 319 that there exists a request for a report message including a notice of event and a position of the target set in a report condition of the trigger parameters even if the target set 207 has no position value, if the target set 207 does not obtain its position value even after steps 225 and 227 illustrated in FIG. 2 (e.g., in a case where a position value calculation is performed by the H-SLP 205, and the position value calculated by the H-SLP 205 is not transmitted to the target set 207), the target set 207 proceeds to step 329, transmits a message requesting a position value calculation to be initiated to the H-SLP 205, and then calculates a position value of the target set 207 together with the H-SLP 205. Next, if the position value calculation is finished with the completion of step 329, the target set 207 proceeds to step 331, and specifies a mobility event for the trigger type when preparing a SUPL REPORT message. Then, the target set 207 states the need for including position value in the 'position mode' shown in TABLE 6, and transfers the SUPL REPORT message including the need for including the position value to the H-SLP 205. Next, on receiving the SUPL REPORT message, the H-SLP 205 adds position value that the H-SLP 205 has to the SUPL REPORT message, and then transmits the SUPL REPORT message including the added position value to the SUPL agent 203.

Meanwhile, a description was made of the requester for the triggered service that exists in the network, and determines if the target set moves. However, it is a matter of course that on the other hand, there can exist a case where a requester of a triggered service is substantially the same as a user of a target set. Accordingly, if the user of the target set makes a request for a mobility event in this case, the target set determines the request for the mobility event, and transmits a message giving notice that the mobility event happens. Then, if the target set makes a request for position value, the target set gains access to an H-SLP, and then carries out a process for calculating position value. This procedure will be examined with reference to FIG. 4.

Figure 4:
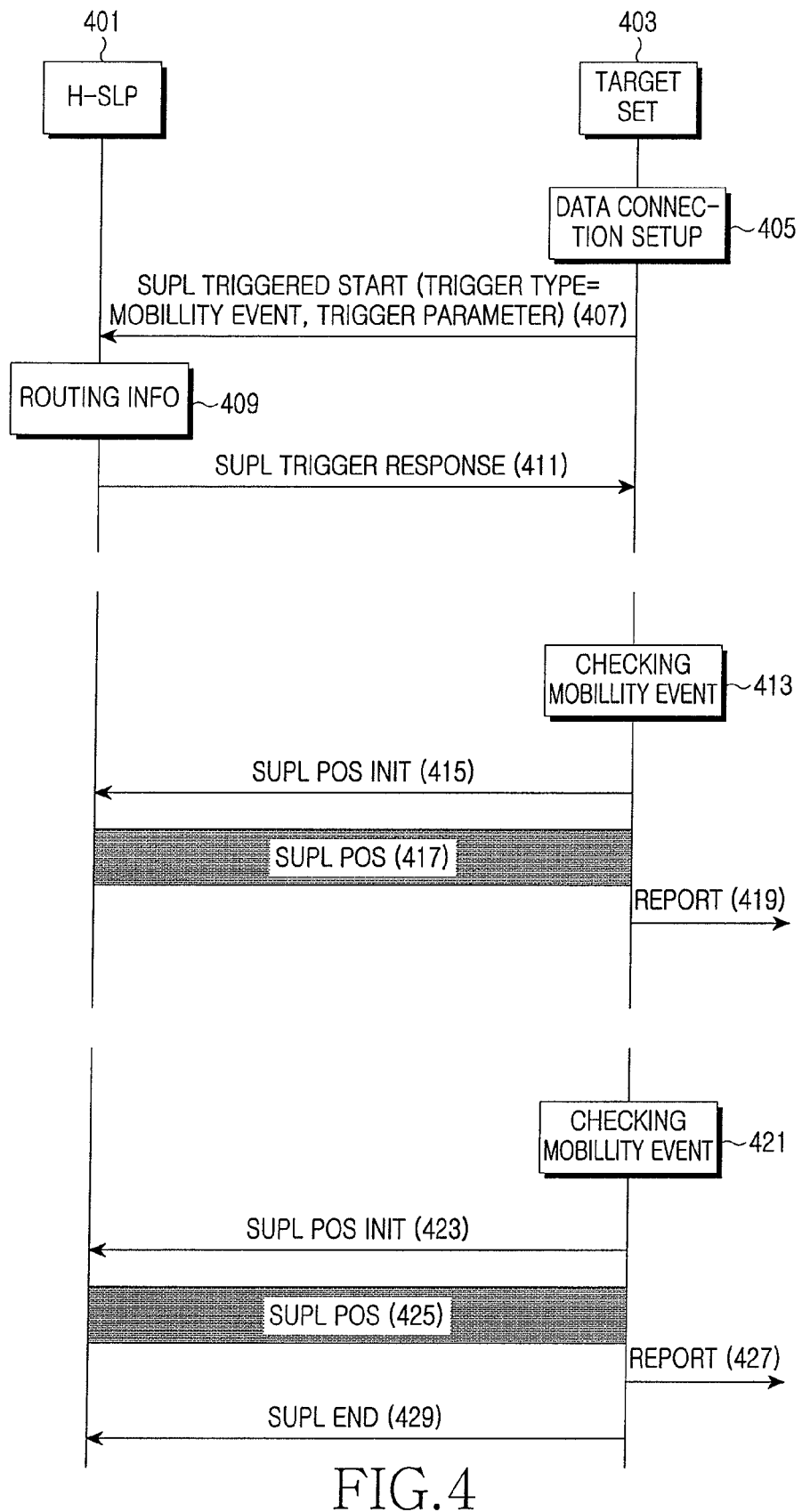
FIG. 4 is a view illustrating an operation flow in a case where a mobility triggered service is implemented on the basis of SEI INIT according to an exemplary embodiment of the present invention.

FIG. 4 is a view illustrating an operation flow in a case where a mobility triggered service is implemented on the basis of SEI INIT according to an exemplary embodiment of the present invention.

Referring to FIG. 4, in step 405, if a user of a target set 403 makes a request for a mobility event service, the target set 403 receiving a request message obtains access to an H-SLP 401 so as to perform data communications.

Then, the target set 403 proceeds to step 407, and transfers a SUPL TRIGGERED START message to the H-SLP 401. The SUPL TRIGGERED START message includes an ID of the target set 403, the contents reporting that a trigger type is set to a mobility event, and trigger parameters. Herein, a session ID corresponds to an identifier to distinguish a currently requested service from other services, a target set ID corresponds to an identifier of the target set 403, and a trigger type corresponds to a parameter indicating what kind of location service is requested.

Also, the trigger parameters include set information on conditions of a currently requested location service. In these trigger parameters, there are start time expressing a period of time during which the service progresses and stop time. Herein, the stop time can be an infinite quantity. In this case, the location service of the target set 403 can continue to be provided. The above trigger parameters can include information on the definite duration instead of the start time and the stop time. Also, the trigger parameters can include information which when the target set 403 receives a report following its movement, causes only a report giving notice that the target set 403 changes its position to be received, or causes the report giving notice that the target set 403 changes its position to be received simultaneously with the current position value of the target set 403. The trigger parameters included in an MLP TLRR message like this can be configured to have the structure as shown in TABLE 1.

Meanwhile, on receiving the SUPL TRIGGERED START message from the target set 403, the H-SLP 401 determines if the target set 403 currently exists in a home network or in an external network. A description will be made of an exemplary embodiment of the present invention illustrated in FIG. 4 on the assumption of a case where the target set 403 exists in the home network. Nevertheless, it goes without saying that an exemplary embodiment of the present invention can also be applied to a roaming case where a target set 403 exists in the external network. This is why while determining if a mobility event occurs, even the target set in process of roaming detects a change of information peculiar to an area, including either a cell ID, an access ID, or an IP address, etc., transmitted by an entity of a network to which the target set obtains current access, and can provide a mobility event service in step 409.

Thereafter, the H-SLP 401 proceeds to step 411, and delivers a SUPL TRIGGERED RESPONSE message to the target set 403.

Then, the target set 403 proceeds to step 413, and determines if an event happens by using the stored trigger parameters. Herein, since the trigger type is set to mobility as in the above-stated assumption of an exemplary embodiment of the present invention, the target set 403 determines if the event happens according to whether the target set 403 changes its position. Parameters used to this end are substantially the same as the three cases described in step 223 shown in FIG. 2. Also, it goes without saying that even though a description is made herein to cite three cases as examples, other parameters can also be adopted if the target set 403 receives parameters transmitted from an entity existing in a network, and if the target set 403 can determine whether the target set 403 detects the variation of the parameters in a case where the parameters transmitted from the entity of the network change according to the movement of the target set 403.

If it is determined in step 413 that the mobility event happens, the target set 403 prepares to give notice of pertinent contents. At this point, the target set 403 determines whether a notice of the mobility event is given or the notice of the mobility event is given simultaneously with the position value of the target set 403 according to a report condition of the trigger parameters. In a case where only the notice of the mobility event is given, it is determined if the event occurs. In a case where a notice of whether the event occurs is only given, the target set 403 proceeds to step 419, and delivers only the notice of the occurrence of the event.

Still, if the notice of the mobility event is given simultaneously with the position value of the target set 403, the target set 403 proceeds to step 415, and delivers a SUPL POS INIT message to the H-SLP 401. Then, the H-SLP 401 and the target set 403 perform step 417, and carry out a process for calculating the position value of the target set 403. At this point, before entering step 415, the target set 403 determines if there is auxiliary information on a previous position or previous position value which has already been stored, and then confirms if the auxiliary information on the previous position or the previous position value is suitable for QoP requested by the SUPL agent. If the auxiliary information on the previous position or the previous position value is suitable for the QoP, the target set 403 reports the current position value by using the previous position value. However, if there is no auxiliary information on previous position or no previous position value, or if the auxiliary information on the previous position or the previous position value is unsuitable for the QoP requested by the SUPL agent, the procedure proceeds to steps 415 and 417, and the process for calculating the position value of the target set 403 is performed.

If the H-SLP 401 carries out the position value calculation, the H-SLP 401 transmits the calculated position value to the target set 403 in step 417. Then, the target set 403 obtains the position value, and reports the obtained position value to a service user.

A procedure from step 421 to step 427 is substantially the same as the procedure from step 413 to step 419. Also, the procedure is repeatedly performed according to conditions of the relevant triggered service.

However, if the procedure of the triggered service reach is completed as all conditions of the triggered service are fulfilled, the target set 403 transmits a SUPL END message to the H-SLP 401 in step 429. In another case, the H-SLP 401 determines an end condition, and can also deliver a SUPL END message to the target set 403.

FIG. 4 illustrates a case where the target set 403 exists in the home network, but even in a case where the target set 403 is in process of roaming, the mobility triggered service can be provided by using the same method as in an exemplary embodiment of the present invention.

Figure 5:
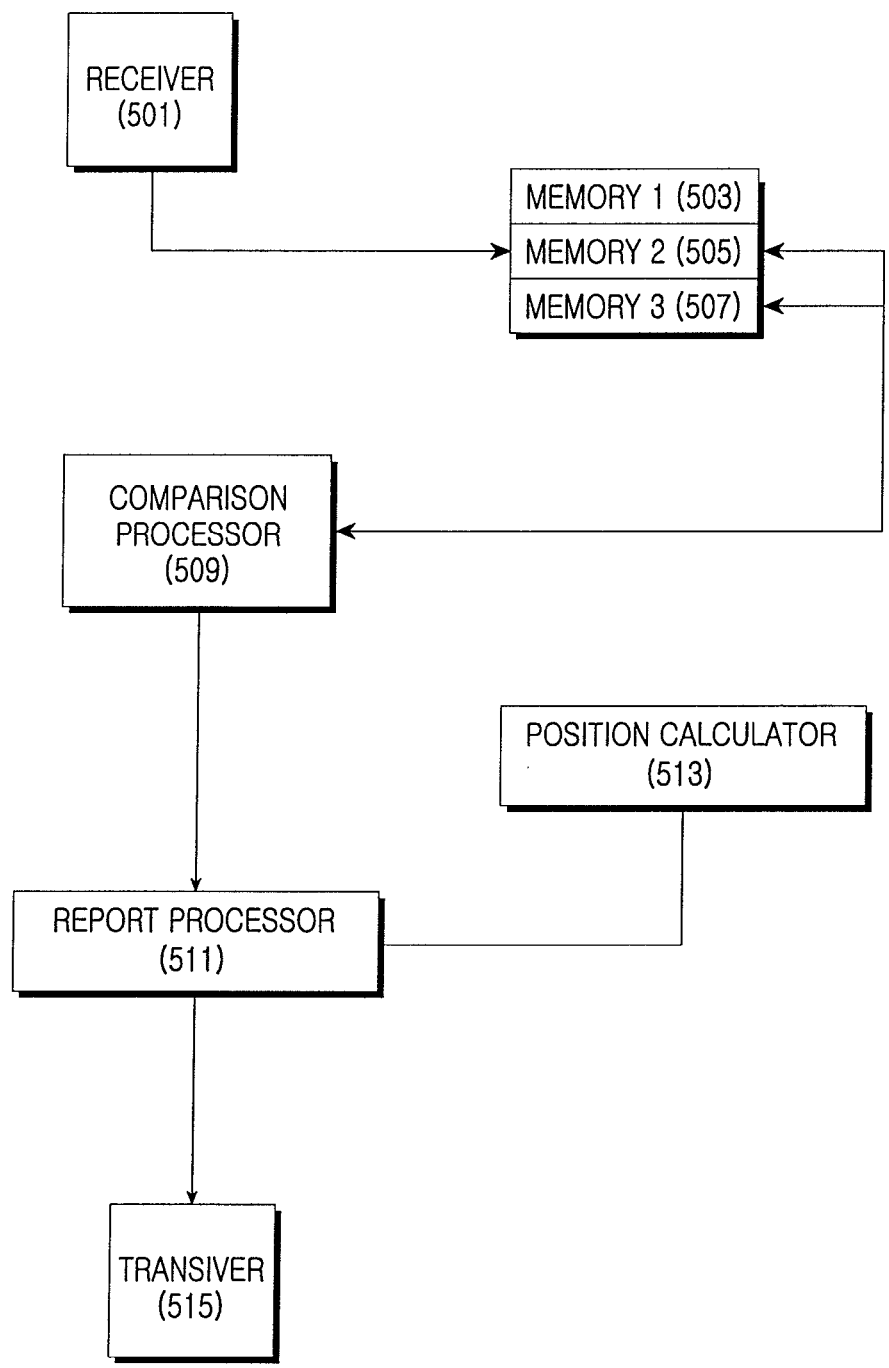
FIG. 5 is a block diagram illustrating a configuration of a target set that can provide a mobility triggered service according to an exemplary embodiment of the present invention.

FIG. 5 is a block diagram illustrating a configuration of a target set that can provide a mobility triggered service according to an exemplary embodiment of the present invention.

Referring to FIG. 5, the target set according to an exemplary embodiment of the present invention is configured to include a receiver 501, a first memory 503, a second memory 505, a third memory 507, a comparison processor 509, a position calculator 513, a report processor 511 and a transiver 515.

Herein, the first memory 503 has conditions related to the mobility triggered service stored therein. Namely, the target set stores, in the first memory 503, the trigger type transmitted from the H-SLP to the target set in steps 301 and 303 shown in FIG. 3. Then, the target set stores the trigger parameters in the first memory 503 in step 307 shown in FIG. 3.

Next, the target set determines if an event of the mobility triggered service occurs according to the conditions related to the mobility triggered service stored in the first memory 503.

The target set receives either a cell ID, an access ID, or an IP address transmitted either from an external BS, from an access point, or from a router through the receiver 501.

At this point, the target set stores either the cell ID, the access ID, or the IP address received through the receiver 501 in the second memory 505.

The comparison processor 509 compares either the current cell ID, the current access ID, or the current IP address stored in the second memory 505 either with a previous cell ID, with a previous access ID, or with a previous IP address. Herein, the value of either the previous cell ID, the previous access ID, or the previous IP address is stored in the third memory 507.

The comparison processor 509 determines a difference between the previous value and the current value following the comparison. Then, following the completion of the comparison process, the comparison processor 509 stores the contents of the second memory 505 in the third memory 507. Accordingly, information peculiar to an area stored in the third memory 507 is replaced by the values stored in the second memory 505. Still, if there is no difference between the previous value and the current value, the comparison processor 509 does not change the value stored in the third memory 507.

If the receiver 501 newly receives either a cell ID, an access ID, or an IP address, either the newly received cell ID, the newly received access ID, or the newly received IP address is stored in the second memory 505. The previously stored value is deleted from the third memory 505.

The comparison processor 509 compares the value stored in the third memory 507 with the value stored in the second memory 505, and if the comparison processor 509 detects a difference between the two values, and enables the report processor 511 to operate. The report processor 511 refers to the first memory 503, and determines a report method. In a case where the position value of the target set should be found while performing a report, the report processor 511 enables the position calculator 513 to operate. A specific operation of the report processor 511 is described across a procedure from step 315 to step 329 illustrated in FIG. 3. In a case where the position value of the target set need not be found while performing a report, the report processor 511 makes a message, delivers the message to the transiver 515, and then enables the transiver 515 to transmit the message. However, it is needless to say that the position calculator 513 may not be necessary if the target set does not perform a position value calculation but the H-SLP performs the position value calculation. Namely, in this case, the target set exchanges only messages and information in order that the H-SLP and the target set may perform the position value calculation, and the target set itself does not perform the position value calculation. Therefore, in this case, if a process for calculating the position value is completed, the target set includes, in a report, information that a mobility event happens and information that it is necessary to include the position value in the report, and enables the transiver 515 to transmit the report to the H-SLP. Then, the H-SLP includes position value calculated by it in the report received from the target set, and transfers the report including the position value to the SUPL agent. The first, second and third memories 503, 505 and 507 means segmented areas in one memory, and it is a matter of course that they can also exist as separate memories.

The merits and effects of exemplary embodiments, as disclosed in an exemplary embodiment of the present invention, and as so configured to operate above, will be described as follows.

In an exemplary embodiment of the present invention, a target set can determine if the target set moves by using information (i.e., the information peculiar to an area) received from a network. This is why an entity of a network corresponds to a fixed existence while the target set can be a mobile existence. Consequently, information that the target set receives from the network becomes different indicates that the target set moves. Thus, through comparison between previous information and current information received from the entity of the network, the target set can determine if it moves. Accordingly, in a case where a requester for a location service makes a request for determining if the target set moves, the target set according to an exemplary embodiment of the present invention is enabled to confirm if the target set moves by itself, and then is enabled to transfer a report according to the confirmation. On this account, the requester for the location service can be informed of the movement of the target set every time it moves, and according to conditions, can be supplied with the position value of the target set at a point of time the target set moves. Consequently, as the existing network system is utilized as it is, a mobility event can be provided.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims and their equivalents.

What is claimed is:

1. A system for providing a mobility event triggered service of a target set, the system comprising:
   a Home Secure User Plane Location (SUPL) Location Platform (H-SLP) for receiving a mobility triggered service request which requests the target set to report an event occurs of the target set and includes start time and stop time of the mobility triggered service from a SUPL agent, for sending the mobility triggered service request to the target set, and for providing a received report to the SUPL agent on receiving the report of a mobility triggered service from the specific target set; and
   a target set for receiving the mobility triggered service request from the H-SLP, for determining whether information of an area where the target set is currently located is newly received after the start time, for comparing the newly received information of the area where the target set is currently located with previously stored information of an area where the target set is previously located if the information of the area where the target set is currently located is newly received, for determining that the event occurs if there is a difference between the two pieces of information, for storing the newly received information if there is the difference between the two pieces of information, and for providing a report of the mobility triggered service comprising notice of the occurrence of the event to the H-SLP,
   wherein the target set repeats the reporting of the occurrence of the event whenever the event occurs between the start time and the stop time.

2. The system as claimed in claim 1, wherein the H-SLP receives, from the SUPL agent, a request for the mobility triggered service corresponding to a triggered service in which mobility is specified for a triggered service type.

3. The system as claimed in claim 2, wherein the request for the mobility triggered service further comprises:
   a condition for determining if the mobility triggered service occurs; and
   information indicating whether a position value according to the current position of the target set is included in the report.

4. The system as claimed in claim 3, wherein the target set receives, from the H-SLP, the condition for determining if the mobility triggered service occurs and information indicating whether the position value according to the current position of the target set in the report, determines if the mobility triggered service is started according to the condition for determining if the mobility triggered service occurs, and calculates, along with the H-SLP, the position value of the target set according to the information indicating whether the position value is included when the event occurs.

5. The system as claimed in claim 4, wherein the target set determines if a previously stored position value can be used when the previously stored position value of the target set exists while performing the calculation of the position value, includes the previously stored position value in the report if the previously stored position value can be used, and transmits the report including the previously stored position value.

6. The system as claimed in claim 4, wherein the target set transmits, to the H-SLP, a message for the initiation of a position value calculation while performing the calculation of the position value, calculates the position value of the target set by using auxiliary information on positions received from the H-SLP, includes the calculated position value in the report, and transmits the report including the calculated position value.

7. The system as claimed in claim 4, wherein the target set transmits the message for the initiation of a position value calculation to the H-SLP while performing the calculation of the position value, includes a request for the calculation of the position value of the target set in a report according to the mobility triggered service giving notice of the occurrence of the event, and transmits the report according to the mobility triggered service including the request for the calculation of the position value.

8. The system as claimed in claim 7, wherein the H-SLP calculates the position value of the target set, includes the calculated position value in the report received from the target set, and transmits the received report including the calculated position value to the SUPL agent.

9. The system as claimed in claim 1, wherein the previously stored information and the newly received information correspond to at least one of a cell IDentification (ID) if the target set is located in a Global System for Mobile communications (GSM) cell, a Code Division Multiple Access (CDMA) cell or a Wideband CDMA (WCDM) cell, an access ID if the target set is located in a World interoperability for Microwave Access (WiMAX) network or in a Wireless Local Area Network (WLAN) network, and wireless Internet Protocol (IP) if the target set is located in a packet switching network, such as a packet switching network of General Packet Radio Service (GPRS) and a packet switching network of Universal Mobile Telecommunications Systems (UMTS), and then performs IP communications.

10. A method for providing a mobility triggered service of a target set to a Secure User Plane Location (SUPL) agent, the method comprising:
    (a) receiving from a Home SUPL Location Platform (H-SLP), by the target set, a mobility triggered service request message which requests the target set to report a movement of the target set and includes start time and stop time of the mobility triggered service;
    (b) determining whether information of an area where the target set is currently located is newly received after the start time;
    (c) comparing, by the target set, previously stored information of an area where the target set is previously located with the newly received information of the area where the target set is currently located if the target set receives the information of the area where the target set is currently located;
    (d) determining, by the target set, that an event of the movement occurs if there is a difference between the two pieces of information;
    (e) storing the newly received information if there is the difference between the two pieces of information;
    (f) transmitting, by the target set, a report of the event of the movement to the H-SLP which notifies the movement of the target set to the SUPL agent; and
    (g) repeating, by the target set, steps (b) to (f) until the stop time.

11. The method as claimed in claim 10, wherein the mobility triggered service request message comprises at least one of a triggered service type set to mobility, a unique identifier of the target set, a condition for determining if the mobility triggered service occurs, and a duration of the mobility triggered service designated by the SUPL agent.

12. The method as claimed in claim 10 further comprising:
    (a-1) transmitting an approval message approving a request for the mobility triggered service of the SUPL agent from the target set to the H-SLP according to a standard of approval for the mobility triggered service of the target set; and (a-2) receiving a condition of the mobility triggered service from the H-SLP.

13. The method as claimed in claim 12, wherein the standard for approval corresponds to a user privacy profile possessed by the target set or information indicating whether the approval corresponds to what is personally approved by a user of the target set.

14. The method as claimed in claim 10, wherein the previously stored information and the newly received information correspond to at least one of a cell IDentification (ID) if the target set is located in a Global System for Mobile communications (GSM) cell, a Code Division Multiple Access (CDMA) cell or a Wideband CDMA (WCDM) cell, an access ID if the target set is located in a World interoperability for Microwave Access (WiMAX) network or in a Wireless Local Area Network (WLAN) network, and wireless Internet Protocol (IP) if the target set is located in a packet switching network, such as a packet switching network of General Packet Radio Service (GPRS) and a packet switching network of Universal Mobile Telecommunications Systems (UMTS), and then performs IP communications.

15. The method as claimed in claim 10, wherein the mobility triggered service request message comprises information on whether the current position value of the target set is included in the report.

16. The method as claimed in claim 15, wherein the transmitting of the report in step (f) comprises:
    (f-1) confirming the mobility triggered service request message, and determining if the current position value of the target set is included by the target set;
    (f-2) calculating, by the target set, the position value of the target set through the H-SLP according to information indicating whether the position value of the target set is included; and
    (f-3) including the calculated position value in the report, and transmitting the report including the calculated position value by the target set.

17. The method as claimed in claim 16, wherein the calculating of the position value in step (f-2) comprises:
    determining, by the target set, if a previously stored position value exists;
    determining, by the target set, if the previously stored position value is usable in a case where there exists the previously stored position value; and
    reusing, by the target set, the previously stored position value if the previously stored position value is usable.

18. The method as claimed in claim 16, wherein the calculating of the position value in step (f-2) comprises:
    transmitting a message for the initiation of a position value calculation from the target set to the H-SLP;
    transmitting auxiliary information on positions for the position value calculation from the H-SLP to the target set;
    calculating, by the target set, the position value of the target set by using the auxiliary information on positions received from the H-SLP; and
    including the calculated position value in the report, and transmitting the report including the calculated position value to the SUPL agent by the target set.

19. The method as claimed in claim 16, wherein the calculating of the position value in step (f-2) comprises:
    transmitting a message for the initiation of a position value calculation from the target set to the H-SLP;
    transmitting auxiliary information on positions for calculating the current position of the target set from the target set to the H-SLP;
    calculating, by the H-SLP, the position value of the target set by using the auxiliary information on positions;
    transmitting the calculated position value from the H-SLP to the target set; and
    including the calculated position value in the report, and transmitting the report including the calculated position value to the SUPL agent by the target set.

20. The method as claimed in claim 10, wherein the transmitting of the report in step (f) comprises:
    confirming the mobility triggered service request message, and determining if the current position value of the target set is included by the target set;
    transmitting a message for the initiation of a position value calculation from the target set to the H-SLP according to information indicating whether the position value of the target set is included;
    transmitting a report according to the mobility triggered service giving notice of the current occurrence of an event, auxiliary information on positions for calculating the current position of the target set, and the report including a request for the calculation of the position value of the target set from the target set to the H-SLP;
    calculating, by the H-SLP, the position value of the target set by using the auxiliary information on positions; and
    including the calculated position value in the report, and transmitting the report including the calculated position value to the SUPL agent by the H-SLP.

21. A target set in a system for providing a mobility triggered service, and having a Secure User Plane Location (SUPL) agent, the target set, and a Home SUPL Location Platform (H-SLP), the target set comprising:
    a receiving unit for receiving from the H-SLP a mobility triggered service request message which requests the target set to report a movement of the target set and includes start time and stop time of the mobility triggered service, and for receiving information of an area where the target set is located after the start time of the mobility triggered service;
    a memory unit for storing information on a report condition of the mobility triggered service and the start time and the stop time of the mobility triggered service, for storing information of an area where the target set is previously located, and for storing the information of the area where the target set is located;
    a comparison processing unit for comparing the information of the area where the target set is located with the information of the area where the target set is previously located, and for determining if there exists a difference between the two pieces of information;
    a report processing unit for generating a report giving notice that an event of the mobility triggered service if it is determined that there exists the difference between the two pieces of information during the start time and the stop time; and
    a transmission unit for transmitting the generated report to the H-SLP if the report is generated.

22. The target set as claimed in claim 21, wherein the comparison processing unit deletes the information of the area where the target set is previously located from the memory unit if it is determined that there exists the difference between the two pieces of information.

23. The target set as claimed in claim 21, wherein the report condition comprises information giving notice that the current position value of the target set is included in the report.

24. The target set as claimed in claim 23, wherein the report processing unit comprises position value calculated by the position value calculating unit in the report if the report condition is that the current position value of the target set is included.

25. The target set as claimed in claim 23, wherein the report processing unit, along with the H-SLP, performs a process for calculating the position value of the target set, and comprises, in the report, information that a calculation of the position value of the target set is required, if the report condition is that the current position value of the target set is included.

* * * * *